(12) United States Patent
Lakshminarayana et al.

(10) Patent No.: US 11,017,064 B2
(45) Date of Patent: May 25, 2021

(54) AUTHENTICATION USING INTERPROGRAM COMMUNICATION

(71) Applicant: BANK OF AMERICA CORPORATION, Charlotte, NC (US)

(72) Inventors: Nagasubramanya Lakshminarayana, Hyderabad (IN); Udaya Kumar Raju Ratnakaram, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 183 days.

(21) Appl. No.: 16/411,836

(22) Filed: May 14, 2019

(65) Prior Publication Data

US 2020/0364320 A1  Nov. 19, 2020

(51) Int. Cl.
*G06F 21/31* (2013.01)
*H04W 12/30* (2021.01)

(52) U.S. Cl.
CPC ............ *G06F 21/31* (2013.01); *H04W 12/30* (2021.01)

(58) Field of Classification Search
CPC .............................. G06F 21/31; H04W 12/002
USPC ........................................................ 726/19
See application file for complete search history.

(56) References Cited

U.S. PATENT DOCUMENTS

| | | | |
|---|---|---|---|
| 7,046,995 B2 | 5/2006 | Rygaard | |
| 7,299,364 B2 | 11/2007 | Noble et al. | |
| 7,647,628 B2 | 1/2010 | Kebinger et al. | |
| 7,844,819 B2 | 11/2010 | Minemura | |
| 8,533,796 B1 | 9/2013 | Shenoy et al. | |
| 8,566,908 B2 | 10/2013 | Aboujaoude et al. | |
| 8,578,443 B2 | 11/2013 | Narain et al. | |
| 8,607,316 B2 | 12/2013 | Montemurro et al. | |
| 8,689,310 B2 | 4/2014 | Taveau et al. | |
| 8,763,131 B2 | 6/2014 | Archer et al. | |
| 8,769,651 B2 | 7/2014 | Grajek et al. | |
| 8,776,213 B2 | 7/2014 | McLaughlin et al. | |
| 8,832,840 B2 | 9/2014 | Zhu et al. | |
| 8,875,298 B2 | 10/2014 | Li et al. | |
| 8,966,632 B1 | 2/2015 | Huang et al. | |
| 8,966,653 B2 | 2/2015 | Griffin | |
| 8,977,854 B2 | 3/2015 | Lee et al. | |
| 8,990,883 B2 | 3/2015 | Kapoor et al. | |
| 9,027,076 B2 | 5/2015 | Roach et al. | |
| 9,098,708 B2 | 8/2015 | Archer et al. | |

(Continued)

*Primary Examiner* — Jacob Lipman
(74) *Attorney, Agent, or Firm* — Michael A. Springs

(57) ABSTRACT

A device that includes a network interface configured to communicate with a remote database and a memory operable to store a set of applications. The device further includes an authentication engine implemented by a processor. The authentication engine is configured to receive log-in credentials for a user on a first application, to send a user information request to the remote database, and to receive user information in response to sending the request. The authentication engine is further configured to send a user profile information request to a second application and to receive user profile information in response to sending the request. The authentication engine is further configured to identify corresponding information between the user information and the user profile information, to determine that at least a portion of the corresponding information between the user information and the user profile information matches, and to authenticate the user in response to determination.

18 Claims, 3 Drawing Sheets

(56) References Cited

U.S. PATENT DOCUMENTS

| | | |
|---|---|---|
| 9,143,930 B2 | 9/2015 | Lobmaier |
| 9,223,951 B2 * | 12/2015 | Grigg .................. H04L 63/04 |
| 9,231,940 B2 | 1/2016 | Counterman |
| 9,280,655 B2 | 3/2016 | Korkishko et al. |
| 9,317,673 B2 | 4/2016 | Grigg et al. |
| 9,331,995 B2 | 5/2016 | Schneider et al. |
| 9,369,457 B2 | 6/2016 | Grajek et al. |
| 9,378,345 B2 | 6/2016 | Zhang et al. |
| 9,386,007 B2 | 7/2016 | Minov et al. |
| 9,391,977 B2 | 7/2016 | Grigg et al. |
| 9,398,000 B2 | 7/2016 | Grigg et al. |
| 9,407,628 B2 | 8/2016 | Sondhi et al. |
| 9,479,512 B2 | 10/2016 | Castro et al. |
| 9,509,685 B2 | 11/2016 | Grigg et al. |
| 9,509,822 B2 | 11/2016 | Kim |
| 9,525,685 B2 | 12/2016 | Grigg et al. |
| 9,537,835 B2 | 1/2017 | Kim et al. |
| 9,661,038 B2 | 5/2017 | Cetin et al. |
| 9,674,188 B2 | 6/2017 | Sabin et al. |
| 10,200,351 B2 | 2/2019 | Gustayson et al. |
| 10,395,244 B1 * | 8/2019 | Mossier ............. G06Q 20/3226 |
| 2003/0037099 A1 | 2/2003 | Rygaard |
| 2004/0172542 A1 | 9/2004 | Minemura |
| 2006/0053480 A1 | 3/2006 | Lacasse et al. |
| 2009/0292925 A1 | 11/2009 | Meisel |
| 2012/0246079 A1 | 9/2012 | Wilson et al. |
| 2013/0104208 A1 | 4/2013 | Kumar et al. |
| 2014/0189785 A1 | 7/2014 | Castro et al. |
| 2014/0298420 A1 | 10/2014 | Barton et al. |
| 2015/0046990 A1 * | 2/2015 | Oberheide ............. G06F 21/45 726/6 |
| 2015/0365407 A1 | 12/2015 | Jagana et al. |
| 2016/0006757 A1 | 1/2016 | Das et al. |
| 2016/0072801 A1 * | 3/2016 | Cao ........................ H04L 9/00 713/186 |
| 2019/0007400 A1 * | 1/2019 | Navarro Luft ........ H04L 63/083 |

* cited by examiner

AUTHENTICATION USING INTERPROGRAM COMMUNICATION

TECHNICAL FIELD

The present disclosure relates generally to authentication and access control, and more specifically to authentication and access control using interprogram communications.

BACKGROUND

As mobile device utilization continues to increase, detecting and preventing malicious activities performed by bad actors is critical. Mobile devices and applications are vulnerable for hacking and cyber-attacks. For example, a bad actor may obtain mobile application log-in credentials for a user from the dark web and may use these log-in credentials to gain unauthorized access to the user's account and information. Detecting and preventing these types of attacks poses a technical challenge because the bad actor is using valid log-in credentials. Once the bad actor is able to log into an application, the bad actor is able to modify the user's information, exfiltrate user information, or perform any other type of malicious activities.

SUMMARY

As mobile device utilization continues to increase, detecting and preventing malicious activities performed by bad actors is critical. Mobile devices and applications are vulnerable for hacking and cyber-attacks. For example, a bad actor may obtain mobile application log-in credentials for a user from the dark web and may use these log-in credentials to gain unauthorized access to the user's account and information. Detecting and preventing these types of attacks poses a technical challenge because the bad actor is using valid log-in credentials. Once the bad actor is able to log into an application, the bad actor is able to modify the user's information, exfiltrate user information, or perform any other type of malicious activities. For example, a bad actor may compromise the security of the system to access and exfiltrate a user's information. In addition, the performance of the network may become degraded as the bad actor consumes network bandwidth resources to exfiltrate data. Reducing network bandwidth limits the system's ability to send and receive data which degrades the throughput of the system. Thus, it is desirable to provide a technical solution for detecting and preventing these types of attacks.

The system disclosed in the present application provides a technical solution to the technical problems discussed above by using interprogram communications to detect and prevent these types of cyber-attacks. The disclosed system provides several practical applications and technical advantages which include 1) enabling the detection and prevention of cyber-attacks where a bad actor has gain unauthorized access to a user's log-in credentials and 2) increasing the security of applications and their information.

In one embodiment, a user device comprises an authentication engine and a plurality of applications configured to employ interprogram communications with each other. As an example, a user may execute a first application from the plurality of applications on their mobile device to access information. In this example, the first application comprises an authentication engine configured to provide access control to the first application and its information. The authentication engine receives log-in credentials for a user on the first application. The authentication engine sends a user information request to a remote database and receives user information in response to the request. The user information comprises a first set of identifiers associated with the user. For example, the user information may comprise a name, a phone number, and/or an email address. The remote database is a device that is external to the user device and is configured to securely store user information associated with the user.

The authentication engine sends a user profile information request to one or more other applications on the mobile device and receives user profile information in response to the request. The user profile information comprises a second set of identifiers associated with the user. For example, the user profile information may also comprise a name, a phone number, and/or an email address. Here, the authentication engine obtains information from other applications on the user device. In the event that a bad actor attempts to use stolen log-in credentials for another user from their personal user device, then the obtained user profile information from the applications on the mobile device will correspond with information for the bad actor and not the user associated with the stolen log-in credentials. This allows the authentication engine to detect when a cyber-attack is occurring.

The authentication engine identifies corresponding information between the user information and the user profile information and determines whether the corresponding information matches. Here, the authentication engine compares the information obtained from the remote database to the information obtained from the applications on the mobile device to determine whether the user associated with the log-in credentials is accessing the application from their user device. If a bad actor attempts to use stolen log-in credentials for another user from their personal user device, then the information will not match, and the authentication engine can determine that a cyber-attack is occurring. In response to determining that the corresponding information matches, the authentication engine authenticates the user and allows access to the first application and its information. This process protects applications and their information from cyber-attacks and improves the operation of the system by preventing attacks that can gain unauthorized access to information, reduce the performance of the system, or exfiltrate data.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
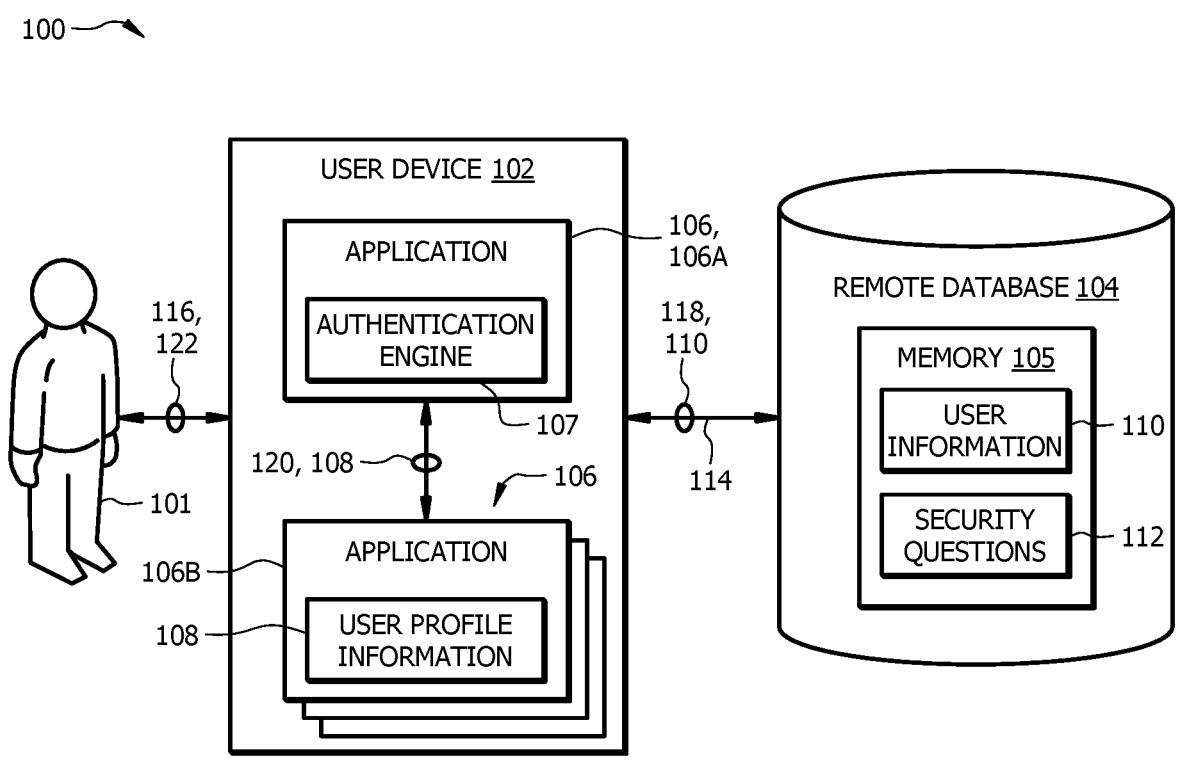
FIG. 1 is a schematic diagram of an embodiment of a system configured to employ an authentication architecture using interprogram communications.

The system disclosed in the present application provides a technical solution to the technical problems discussed above by using interprogram communications to detect and prevent these types of cyber-attacks. The disclosed system provides several practical applications and technical advantages which include 1) enabling the detection and prevention of cyber-attacks where a bad actor has gain unauthorized access to a user's log-in credentials and 2) increasing the security of applications and their information.

Overview

In one embodiment, a user device comprises an authentication engine and a plurality of applications configured to employ interprogram communications with each other. As an example, a user may execute a first application from the plurality of applications on their mobile device to access information. In this example, the first application comprises an authentication engine that is configured to provide access control to the first application and its information. The authentication engine receives log-in credentials for a user on the first application. The authentication engine sends a user information request to a remote database and receives user information in response to the request. The user information comprises a first set of identifiers associated with the user. For example, the user information may comprise a name, a phone number, and/or an email address. The remote database is a device that is external to the user device and is configured to securely store user information associated with the user for the first application.

The authentication engine sends a user profile information request to one or more other applications on the mobile device and receives user profile information in response to the request. The user profile information comprises a second set of identifiers associated with the user. For example, the user profile information may also comprise a name, a phone number, and/or an email address. Here, the authentication engine obtains information from other applications on the user device. In the event that a bad actor attempts to use stolen log-in credentials for another user from their personal user device, then the obtained user profile information from the applications on the mobile device will correspond with information for the bad actor and not the user associated with the stolen log-in credentials. This allows the authentication engine to detect when a cyber-attack is occurring.

The authentication engine identifies corresponding information between the user information and the user profile information and determines whether the corresponding information matches. Here, the authentication engine compares the information obtained from the remote database to the information obtained from the applications on the mobile device to determine whether the user associated with the log-in credentials is accessing the application from their user device. If a bad actor attempts to use stolen log-in credentials for another user from their personal user device, then the information will not match, and the authentication engine can determine that a cyber-attack is occurring. In response to determining that the corresponding information matches, the authentication engine authenticates the user and allows access to the first application and its information. This process protects applications and their information from cyber-attacks and improves the operation of the system by preventing attacks that can gain unauthorized access to information, reduce the performance of the system, or exfiltrate data.

System Architecture

FIG. 1 is a schematic diagram of an embodiment of a system 100 configured to employ an authentication architecture using interprogram communications between applications 106. In one embodiment, the system 100 comprises a user device 102 in signal communication with a remote database 104. The user device 102 and the remote database 104 are in signal communication with each other over a network connection 114. The network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art. An example of the system 100 in operation is described in FIG. 2.

User Device

Examples of user devices 102 include, but are not limited to, mobile devices (e.g. smart phones or tablets), computers, laptops, or any other suitable type of device. Additional information about the user device 102 is described in FIG. 3. The user device 102 comprises a plurality of applications 106 and an authentication engine 107. For example, the user device 102 may be a smart phone that comprises the authentication engine 107 and a plurality of mobile applications 106.

The applications 106 may comprise social media applications, financial applications, utility applications, health applications, news applications, fitness applications, shopping applications, or any other type of application. One of more of the applications 106 are configured to store user profile information 108 for the user 101. The user profile information 108 comprises a plurality of identifiers and information associated with a user 101. For example, the user profile information 108 may comprise a name, an address, a phone number, an email address, a social security number, demographic information, or any other type of information associated with the user 101. For instance, the user profile information 108 may be information that a user 101 provides to an application 106 when registering an account with the application 106 or information that a user 101 provides to log into an application 106.

In FIG. 1, the authentication engine 107 is shown as being integrated with an application 106A from the plurality of applications 106. In other embodiments, the authentication engine 107 may be configured to operate as a standalone application 106 that communicates with other applications 106. The authentication engine 107 is generally configured to provide access control to application 106 and its information.

In one embodiment, the authentication engine 107 is configured to facilitate an authentication process for application 106A using interprogram communications to exchange information with other applications 106 on the user device 102. For example, the authentication engine 107 may be configured to send a user profile information request 120 to one or more applications 106 and to receive user profile information 108 for the user 101 in response to the request. In another embodiment, the authentication engine 107 is configured to facilitate an authentication process for other applications 106 on the user device 102. In this embodiment, the authentication engine 107 may be utilized by other applications 106 on the user device 102 even when the authentication engine 107 is not integrated within an application 106. For example, a different application 106B may communicate with the authentication engine 107 to employ the authentication engine 107 to perform authentication for the application 106B. In this example, the authentication engine 107 sends the user profile information request 120 to one or more other applications 106 in response to receiving an authentication request from application 106B.

The authentication engine 107 is also configured to communicate with the remote database 104 to request and obtain information about a user 101 from the remote database 104. For example, the authentication engine 107 may be configured to send a user information request 118 to the remote database 104 and to receive user information 110 for the user 101 in response to the request. The authentication engine 107 is configured to compare the information that is obtained from the applications 106 on the user device 102 to the information that is stored remotely in the remote database 104 to verify the identity of a user 101. An example of the authentication engine 107 implementing this process is described in FIG. 2.

In one embodiment, the authentication engine 107 and the applications 106 are configured to communicate with each other using secured open application programming interface (API) calls. For example, the authentication engine 107 and the applications 106 may be configured to send requests for user profile information 108 and to share user profile information 108 using API calls. In other embodiments, the authentication engine 107 and the applications 106 may be configured to communicate with each other using any other suitable technique as would be appreciated by one of ordinary skill in the art. In one embodiment, the authentication engine 107 may be preapproved or preauthorized to request and receive information from the applications 106 on the user device 102. For instance, the authentication engine 107 may provide information (e.g. credentials or a certificate) to authenticate itself with an application 106 before requesting information from the application 106. In other examples, the authentication engine 107 may authenticate itself with an application using any suitable technique as would be appreciated by one of ordinary skill in the art. Once the authentication engine 107 has been authenticated by an application 106, the authentication engine 107 is able to request and receive information from the application 106. This process provides access control by limiting the distribution of information to authorized authentication engines 107.

Remote Database

The remote database 104 is a device that is external from the user device 102. Examples of the remote database 104 include, but are not limited to, a data store, a server, a network attached storage (NAS) device, or any other suitable type of network device. The remote database 104 comprises a memory 105 configured to store user information 110 for the user 101. The user information 110 comprises a set of identifiers and information associated with a user 101. For example, the user information 110 may comprise a name, an address, a phone number, an email address, demographic information, account information, financial information, or any other type of information associated with the user 101.

The memory 105 may also be configured to store security questions 112 associated with the user 101 and one or more of the applications 106 on the user device 102. The security questions 112 are questions that can be used to verify or authenticate the identity of a user 101. For example, the security questions 112 may comprise user defined questions and response. As another example, the security questions 112 may comprise questions that are specific to a user 101, for example questions about a user's date of birth or social security number. As another example, the security questions 112 may comprises a question about code provided to the user 101 as part of a multi-factor authentication process. In other examples, the security questions 112 may comprise any other suitable type of security questions 112.

Authentication Process Using Interprogram Communications

Figure 2:
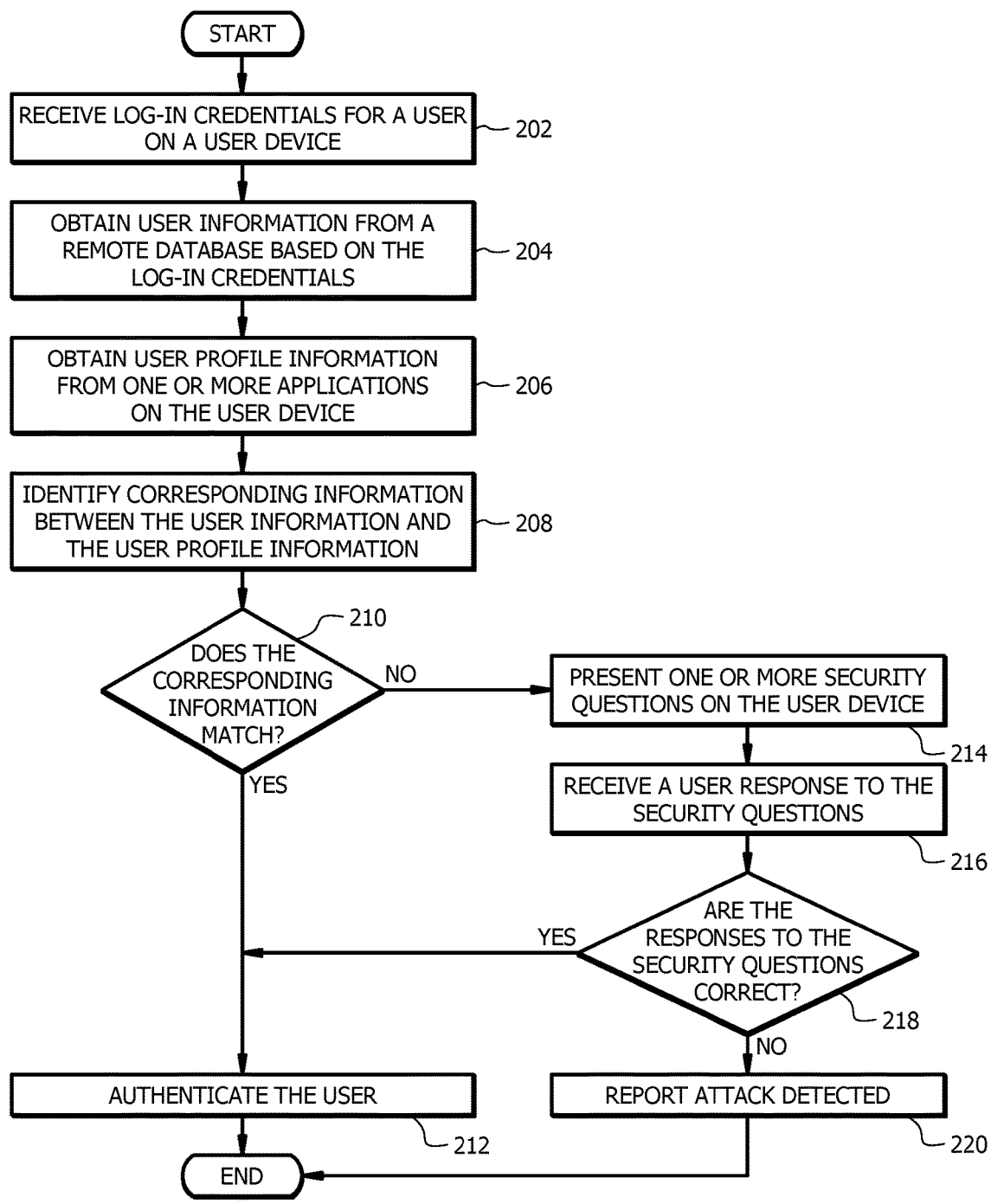
FIG. 2 is an embodiment of a flowchart of an authentication method.

FIG. 2 is an embodiment of a flowchart of an authentication method 200. The following is a non-limiting example of how a user device 102 may employ the authentication engine 107 to implement method 200 for authenticating a user 101 before allowing the user 101 to use an application 106 or to access information within an application 106. In this example, a user 101 executes a mobile application 106A that comprises an integrated authentication engine 107 on a user device 102. When the application 106A launches, the application 106A may prompt the user 101 to provide log-in credentials 116.

At step 202, the authentication engine 107 receives log-in credentials 116 for a user 101 on the user device 102. For example, the authentication engine 107 may receive a username and password, a mobile number, an email address, a touch identifier, or any other suitable type of identifier that uniquely identifies the user 101 and/or the user's account.

At step 204, the authentication engine 107 obtains user information 110 from a remote database 104 based on the log-in credentials 116. In one embodiment, the authentication engine 107 sends a user information request 118 that comprises the log-in credentials 116 to the remote database 104. The user information request 118 serves as a query to the remote database 104 for user information 110 for the user that is associated with the log-in credentials 116. For example, the remote database 104 may compile user information 110 that comprises a name, a phone number, and an email address that are associated with the log-in credentials 116. Once the remote database 104 compiles the user information 110, the remote database 104 sends the user information 110 to the authentication engine 107.

At step 206, the authentication engine 107 obtains user profile information 108 from one or more applications 106 on the user device 102. In one embodiment, the authentication engine 107 sends a user profile information request 120 to one or more other applications 106 on the user device 102. The authentication engine 107 may be preauthorized to send requests to the one or more applications 106 to request user profile information 108 for the user 101. For example, the authentication engine 107 may send an API call to one or more applications 106 to request user profile information 108 for the user 101. One or more of the applications 106 may respond to the user profile information request 120 by sending their stored user profile information 108 to the authentication engine 107. For example, an application 106 may be configured to receive the user profile information request 120 from the authentication engine 107 and to determine that the authentication engine 107 is authorized to request user profile information 108. In response to determining that the authentication engine 107 is authorized to request and receive user profile information 108, the application 106 may compile user profile information 108 associated with the user 101 and send the compiled user profile information 108 to the authentication engine 107. As an example, the application 106 may be a social media application that compiles user profile information 108 that comprises a name, a phone number, and an email address for the user 101 based on the information from their profile on the social media application. In other examples, the user profile information 108 may comprise any other information that is associated with the user 101 of the user device 102 where the applications 106 are installed.

In one embodiment, the authentication engine 107 is configured to compile user profile information 108 from multiple applications 106 on the user device 102. For example, the authentication engine 107 may receive a first set of user profile information 108 from a first application 106 on the user device 102 and a second set of user profile information 108 from a second application 106 on the user device 102. In some instances, at least a portion of the user profile information from the different applications 106 is different. As an example, the authentication engine 107 may receive a name and phone number from the first application 106 and may receive a name and email address from the second application 106. The authentication engine 107 is configured to aggregate all of the received user profile information 108 from the different applications 106 to generate a compilation of user profile information 108.

At step 208, the authentication engine 107 identifies corresponding information between the user information 110 and the user profile information 108. Here, the authentication engine 107 identifies similar types of information from between the user information 110 and the user profile information 108. Examples of information types include, but are not limited to, names, phone numbers, email addresses, physical addresses, birthdates, or any other suitable type of information. For instance, the authentication engine 107 may identify information types for the set of identifiers in the user information 110 and the set of identifies in the user profile information 108. Continuing with the previous example, the authentication engine 107 may compare the name, phone number, and email address in the received user information 110 to the name, phone number, and email address in the received the user profile information 108.

At step 210, the authentication engine 107 determines whether the corresponding information between the user information 110 and the user profile information 108 match. In one embodiment, the authentication engine 107 determines that the corresponding information between the user information 110 and the user profile information 108 match when all of the corresponding information matches. For instance, continuing with the previous example, the authentication engine 107 determines that the corresponding information between the user information 110 and the user profile information 108 match when the name, phone number, and email address in the received user information 110 are the same as the name, phone number, and email address in the received the user profile information 108.

In another embodiment, the authentication engine 107 determines that the corresponding information between the user information 110 and the user profile information 108 match when at least a portion of the corresponding information matches. For instance, the authentication engine 107 may determine the corresponding information matches when the number of matching information elements exceeds a predetermined threshold. The predetermined threshold may be 10%, 25%, 50%, 75%, or any other suitable percentage. For example, the predetermined threshold may be set to 50%. This means that the authentication engine 107 determines that corresponding information matches when at least 50% of the information matches. Continuing with the previous example, the authentication engine 107 determines that the corresponding information between the user information 110 and the user profile information 108 match when at least two of the name, phone number, and email address are the same between the user information 110 and the user profile information 108. This embodiment takes into account any discrepancies between the user information 110 and the user profile information 108. For example, the user information 110 may have the user's 101 full legal name while the user profile information 108 may have an abbreviated version or pseudo name for the user 101. As another example, the user information 110 and the user profile information 108 may each have different email addresses for the user 101.

In one embodiment, the authentication engine 107 may determine the corresponding information matches when at least a predetermined number of corresponding elements between the user information 110 and the user profile information 108 match. For instance, the authentication engine 107 may determine the corresponding information matches when at least three corresponding elements between the user information 110 and the user profile information 108 match. In other examples, the authentication engine 107 may determine the corresponding information matches when any other suitable number of corresponding elements between the user information 110 and the user profile information 108 match.

In one embodiment, the authentication engine 107 may determine the corresponding information matches when prespecified corresponding elements between the user information 110 and the user profile information 108 match. For instance, the authentication engine 107 may determine the corresponding information matches when at least the email address in the user information 110 and the user profile information 108 match. In other examples, the authentication engine 107 may determine the corresponding information matches when any other prespecified corresponding elements between the user information 110 and the user profile information 108 match. The authentication engine 107 proceeds to step 212 in response to determining that the corresponding information between the user information 110 and the user profile information 108 match. At step 212, the authentication engine 107 authenticates the user 101. Here, the authentication engine 107 authenticates the user 101 which allows the user 101 to access to the application 106A and information in the application 106A.

Returning to step 210, the authentication engine 107 proceeds to step 214 in response to determining that the corresponding information between the user information 110 and the user profile information 108 does not match. At step 214, the authentication engine 107 presents one or more security questions 112 on the user device 102 to the user 101. As an example, the security questions 112 may comprise user defined questions. As another example, the security questions 112 may comprise questions that are specific to a user 101, for example questions about a user's date of birth or social security number. As another example, the security questions 112 may comprises a question about code provided to the user 101 as part of a multi-factor authentication process. In other examples, the security questions 112 may comprise any other suitable type of security questions 112.

In one embodiment, the authentication engine 107 is configured to obtain the security questions 112 from the remote database 104. For example, the authentication engine 107 may request one or more security questions 112 for the user 101. In another embodiment, the security questions 112 may be stored locally in a memory (e.g. memory 304) for the application 106 and the authentication engine 107 may obtain the security questions 112 from the memory.

The authentication engine 107 uses security questions 112 as a secondary method to confirm the identity of the user 101. In one embodiment, the authentication engine 107 may present security questions 112 on the user device 102 as an application pop-up. In other embodiments, the authentication engine 107 may present security questions 112 on the user device 102 using any other suitable technique as would be appreciated by one of ordinary skill in the art.

At step 216, the authentication engine 107 receives a user response 122 to the security questions 112. For example, the authentication engine 107 may receive text responses from the user 101 in response to the security questions 112. In other examples, the authentication engine 107 may receive voice responses, gesture responses, or any other suitable type of response from the user 101.

At step 218, the authentication engine 107 determines whether the user response to the security questions 112 is correct. Here, the authentication engine 107 compares the user response 122 to stored responses to the security questions 112 to determine whether the user response 122 is correct. For example, the security question 112 may be a question about the user's 101 favorite movie and the authentication engine 107 determines whether the user response 122 correctly identifies the user's favorite movie. The authentication engine 107 determines that the user response 122 to the security questions 112 is correct when the user response 122 matches the stored responses to the security questions 112.

The authentication engine 107 proceeds to step 212 to authenticate the user 101 in response to determining that the user response 122 to the security questions 112 is correct. Otherwise, the authentication engine 107 proceeds to step 220 in response to determining the user response 122 to the security questions 112 is incorrect.

At step 220, the authentication engine 107 reports that an attack has been detected. For example, the authentication engine 107 may send an alert that indicates an attack has been detected. Examples of an alert include, but are not limited to, an application pop-up, a notification, a text message, an email, or any other suitable type of alert. The alert may identify the type of attack, the device where the attack was being performed, and/or any other suitable type of information. For example, the alert may comprise an identifier (e.g. a MAC address or phone number) for the user device 102. In other examples, the alert may comprise any other suitable type of identifier for the user device 102.

In one embodiment, the authentication engine 107 may bypass steps 214, 216, and 218 and proceed directly to step 220 in response to determining that the corresponding information between the user information 110 and the user profile information 108 does not match. In this case, the authentication engine 107 does not use a secondary method to attempt to authenticate the user 101 and instead reports that an attack has been detected.

Application Fault Detection Device

Figure 3:
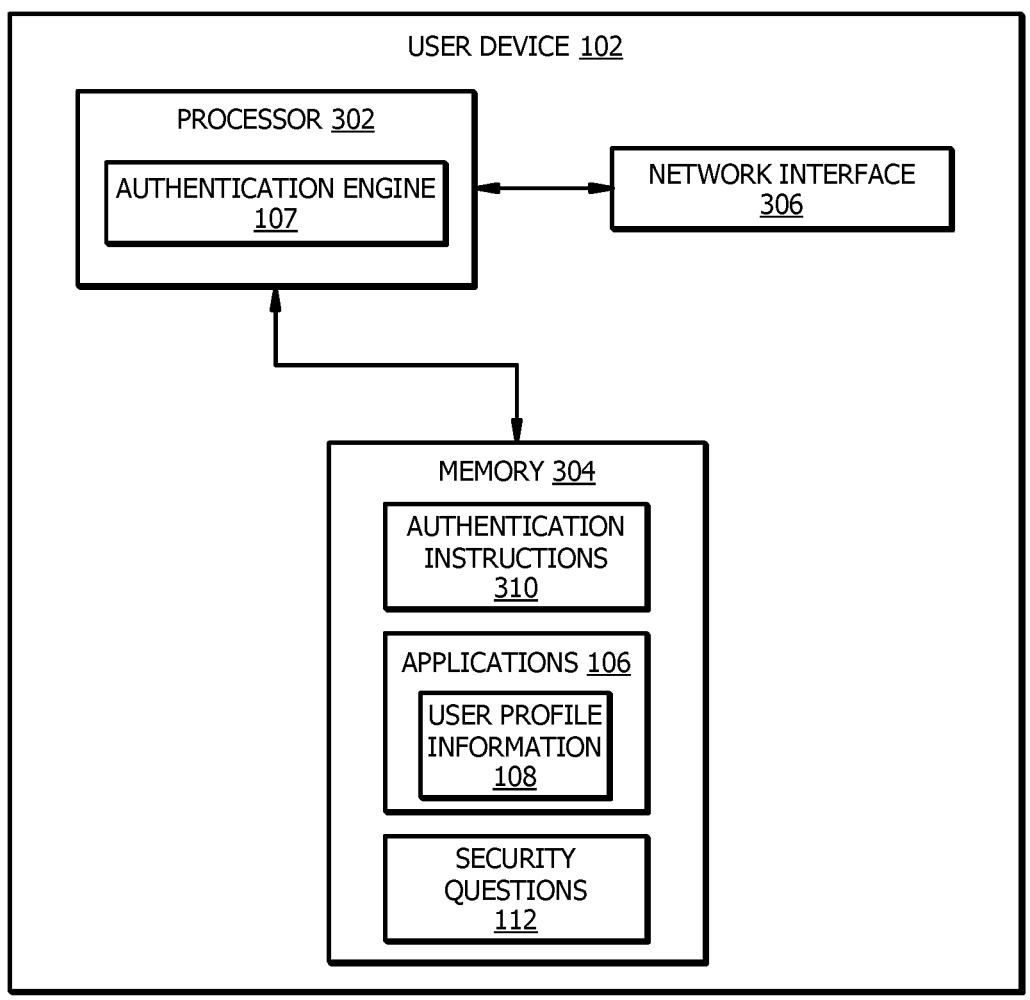
FIG. 3 is an embodiment of a user device configured to implement an authentication architecture using interprogram communications.

FIG. 3 is an embodiment of a user device 102 configured to implement an authentication architecture using interprogram communications. The user device 102 comprises a processor 302, a memory 304, and a network interface 306. The user device 102 may be configured as shown or in any other suitable configuration.

The processor 302 comprises one or more processors operably coupled to the memory 304. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 304. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement an authentication engine 107. In this way, processor 302 may be a special purpose computer designed to implement the functions disclosed herein. In an embodiment, the authentication engine 107 is implemented using logic units, FPGAs, ASICs, DSPs, or any other suitable hardware. The authentication engine 107 is configured operate as described in FIGS. 1 and 2. In one embodiment, the authentication engine 107 may be configured to operate as a standalone application that communicates with other applications 106. In another embodiment, the authentication engine 107 may be integrated with or embedded within one or more applications 106.

The memory 304 comprises one or more disks, tape drives, or solid-state drives, and may be used as an over-flow data storage device, to store programs when such programs are selected for execution, and to store instructions and data that are read during program execution. The memory 304 may be volatile or non-volatile and may comprise read-only memory (ROM), random-access memory (RAM), ternary content-addressable memory (TCAM), dynamic random-access memory (DRAM), and static random-access memory (SRAM).

The memory 304 is operable to store authentication instructions 210, applications 106, user profile information 108, security questions 112 and/or any other data or instructions. The authentication instructions 310 may comprise any suitable set of instructions, logic, rules, or code operable to execute the authentication engine 107. The applications 106, user profile information 108, and the security questions 112 are configured similar to the applications 106, user profile information 108, and the security questions 112 described in FIGS. 1 and 2, respectively.

The network interface 306 is configured to enable wired and/or wireless communications. The network interface 306 is configured to communicate data between the user device 102 and other devices (e.g. remote database 104), systems, or domain. For example, the network interface 306 may comprise a WIFI interface, a LAN interface, a WAN interface, a modem, a switch, or a router. The processor 302 is configured to send and receive data using the network interface 306. The network interface 306 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A user device, comprising:
    a network interface configured to communicate with a remote database;
    a memory operable to store a plurality of applications;
    a processor operably coupled to the network interface and the memory, and configured to:
        receive log-in credentials for a user on a first application from the plurality of applications;
        send a user information request for user information for the user to the remote database, wherein the request comprises the log-in credentials;
        receive user information in response to sending the user information request, wherein the user information comprises a first plurality of identifiers for the user that are associated with the log-in credentials;
        send a user profile information request to a second application from the plurality of applications stored in the memory;
        receive user profile information in response to sending the user profile information request, wherein the user profile information comprises a second plurality of identifiers for the user that are associated with a user profile for the second application;
        identify corresponding information between the user information and the user profile information;
        determine that at least a portion of the corresponding information between the user information and the user profile information matches; and
        authenticate the user in response to determining that at least a portion of the corresponding information between the user information and the user profile information matches.

2. The device of claim 1, wherein determining that at least a portion of the corresponding information between the user information and the user profile information matches comprises determining that a predetermined number of corresponding elements between the user information and the user profile information match.

3. The device of claim 1, wherein determining that at least a portion of the corresponding information between the user information and the user profile information matches comprises determining that at least 50% of the corresponding elements between the user information and the user profile information match.

4. The device of claim 1, wherein determining that at least a portion of the corresponding information between the user information and the user profile information matches comprises determining that all of the corresponding elements between the user information and the user profile information match.

5. The device of claim 1, wherein determining that at least a portion of the corresponding information between the user information and the user profile information matches comprises determining that at least one prespecified element between the user information and the user profile information match.

6. The device of claim 1, wherein the processor is further configured to:
    identify information types for the first plurality of identifiers for the user;
    identify information types for the second plurality of identifiers for the user; and
    wherein identifying corresponding information between the user information and the user profile information is based on the information types for the first plurality of identifiers and information types for the second plurality of identifiers.

7. The device of claim 1, wherein the processor is further configured to send a second user profile information request to a third application from the plurality of application; and
    wherein receiving user profile information comprises receiving at least a portion of the user profile information from the second application and at least a portion of the user profile information from the third application.

8. The device of claim 7, wherein at least a portion of the user profile information from the second application is different from the user profile information from the third application.

9. An authentication method, comprising:
    receiving log-in credentials for a user on a first application from a plurality of applications on a user device;
    sending a user information request for user information for the user to a remote database, wherein the request comprises the log-in credentials;
    receiving user information in response to sending the user information request, wherein the user information comprises a first plurality of identifiers for the user that are associated with the log-in credentials;
    sending a user profile information request to a second application from the plurality of applications stored in a memory on the user device;
    receiving user profile information in response to sending the user profile information request, wherein the user profile information comprises a second plurality of identifiers for the user that are associated with a user profile for the second application;
    identifying corresponding information between the user information and the user profile information;
    determining that at least a portion of the corresponding information between the user information and the user profile information matches; and authenticating the user in response to determining that at least a portion of the corresponding information between the user information and the user profile information matches.

10. The method of claim 9, further comprising:
identifying information types for the first plurality of identifiers for the user;
identifying information types for the second plurality of identifiers for the user; and
wherein identifying corresponding information between the user information and the user profile information is based on the information types for the first plurality of identifiers and information types for the second plurality of identifiers.

11. The method of claim 9, further comprising sending a second user profile information request to a third application from the plurality of applications on the user device; and
wherein receiving user profile information comprises receiving at least a portion of the user profile information from the second application and at least a portion of the user profile information from the third application.

12. The method of claim 11, wherein at least a portion of the user profile information from the second application is different from the user profile information from the third application.

13. A computer program comprising executable instructions stored in a non-transitory computer readable medium that when executed by a processor causes the processor to:
receive log-in credentials for a user on a first application from a plurality of applications on a user device;
send a user information request for user information for the user to a remote database, wherein the request comprises the log-in credentials;
receive user information in response to sending the user information request, wherein the user information comprises a first plurality of identifiers for the user that are associated with the log-in credentials;
send a user profile information request to a second application from the plurality of applications stored in a memory on the user device;
receive user profile information in response to sending the user profile information request, wherein the user profile information comprises a second plurality of identifiers for the user that are associated with a user profile for the second application;
identify corresponding information between the user information and the user profile information;
determine that at least a portion of the corresponding information between the user information and the user profile information matches; and
authenticate the user in response to determining that at least a portion of the corresponding information between the user information and the user profile information matches.

14. The computer program of claim 13, wherein determining that at least a portion of the corresponding information between the user information and the user profile information matches comprises determining that all of the corresponding elements between the user information and the user profile information match.

15. The computer program of claim 13, wherein determining that at least a portion of the corresponding information between the user information and the user profile information matches comprises determining that predetermined number of corresponding elements between the user information and the user profile information match.

16. The computer program of claim 13, further comprising instructions that when executed by the processor causes the processor to:
identify information types for the first plurality of identifiers for the user;
identify information types for the second plurality of identifiers for the user; and
wherein identifying corresponding information between the user information and the user profile information is based on the information types for the first plurality of identifiers and information types for the second plurality of identifiers.

17. The computer program of claim 13, further comprising instructions that when executed by the processor causes the processor to send a second user profile information request to a third application from the plurality of applications; and
wherein receiving user profile information comprises receiving at least a portion of the user profile information from the second application and at least a portion of the user profile information from the third application.

18. The computer program of claim 17, wherein at least a portion of the user profile information from the second application is different from the user profile information from the third application.

* * * * *